(12) United States Patent
Nishikawa et al.

(10) Patent No.: US 6,246,955 B1
(45) Date of Patent: Jun. 12, 2001

(54) VEHICLE COMMUNICATION SYSTEM DYNAMICALLY ALLOCATING CHANNELS AND A METHOD FOR THE SAME

(75) Inventors: Kumiko Nishikawa; Junichi Watanabe, both of Kawasaki (JP)

(73) Assignee: Public Works Research Institute, Tsukuba (JP)

( * ) Notice: Subject to any disclaimer, the term of this patent is extended or adjusted under 35 U.S.C. 154(b) by 0 days.

(21) Appl. No.: 09/294,182

(22) Filed: Apr. 19, 1999

(30) Foreign Application Priority Data

Apr. 23, 1998 (JP) ................................. 10-113559

(51) Int. Cl.[7] ................................................ G06F 165/00
(52) U.S. Cl. ............................ 701/117; 701/118; 701/119
(58) Field of Search ...................... 701/117, 118, 701/119, 1, 19, 20, 23, 24, 25, 26; 370/328, 329

(56) References Cited

U.S. PATENT DOCUMENTS

| | | | |
|---|---|---|---|
| 4,361,202 | 11/1982 | Minovitch | 180/168 |
| 5,875,183 | 2/1999 | Nitadori | 370/328 |
| 5,887,268 | 3/1999 | Furukawa | 701/23 |
| 5,928,294 | 7/1999 | Zelinkowsky | 701/24 |

*Primary Examiner*—William A. Cuchlinski, Jr.
*Assistant Examiner*—Marthe Y. Marc-Coleman
(74) *Attorney, Agent, or Firm*—Fulbright & Jaworski L.L.P.

(57) ABSTRACT

An area corresponding to a zone 15 on a road 14 is divided to area A and area B, and an information traffic volume in each area is monitored. When overflow is about to occur, time slots for other areas are temporally allocated to the area to evade the overflow, so that shortage of communication channels due to a traffic jam or for some other reasons can be prevented in a system for providing automated driving controls for vehicles by means of communication systems based on a zone system.

16 Claims, 9 Drawing Sheets

View Showing Principles of the Present Invention

Block Diagram Showing AHS

View Showing First Area Arrangement in a Unit Zone

View Showing Second Area Arrangement in a Unit Zone

View Showing Third Area Arrangement in a Unit Zone

Views Showing Slots Divided to Two Groups

Views Showing Slots Divided to Three Groups

View Showing Running in a Platoon

Flow Chart for the Averaging Processing

VEHICLE COMMUNICATION SYSTEM DYNAMICALLY ALLOCATING CHANNELS AND A METHOD FOR THE SAME

FIELD OF THE INVENTION

The present invention relates to vehicle communications based on zone configuration, and more specifically to a vehicle communication system effectively using a frequency and a method for the same.

BACKGROUND OF THE INVENTION

Now very active efforts are made for development of (the Intelligent Transport System: ITS) to be put into practical use in the 21-st century. The ITS is a transport system constructed by using the most advanced data communication technology in which roads and vehicles are integrated with each other. Purposes of construction of this system includes improvement of safety and transport efficiency, realization of improved comfort, and contribution to better environmental conditions.

The most advanced technology used for construction of the ITS is (the Automated Highway System: AHS). The AHS enables completely automatic mode of driving by means of automated controls over information transaction between a road and a car as well as over the car, which makes it possible to reduce work load to a driver and to improve safety and smoothness in driving.

The AHS is realized by the "road-to-vehicle communications" executed between information infrastructure on a road and vehicles and the "vehicle-to-vehicle communications" executed between vehicles. The AHS can respond to various situations by controlling running of vehicles by means of bilateral communications between a road and vehicles as well as of bilateral communications between vehicles.

However, it can be anticipated that the following problems would occur in relation to introduction of automatic run of vehicles in the future.

It is anticipated that the AHS will be managed by means of driving controls by way of mobile communications based on zone configuration for effective utilization of channels. In that case, if a traffic jam occurs on a road, a number of vehicles in one radio zone substantially increases. A number of frequency bands available for the AHS is limited, however, so that shortage of communication channels occurs.

In a case of a portable telephone based on the conventional technology, when the situation as described above occurs, the busy state is notified to a user, and the user is required to stand by for a while, but in a case of AHS, real time controls are provided over vehicles actually running, so that generation of the busy state must be prevented by any means. To achieve the object described above, a system for continuously providing control information to vehicles requiring services under limited environmental conditions is required.

Further, explosive increase of communication equipment put in actual use may require a far larger number of channels than an expected one for a period of time in the future. There is the strong needs for development of a method of suppressing the overflow as described above.

OBJECT AND SUMMARY OF THE INVENTION

It is an object of the present invention to provide a vehicle communication system capable of preventing shortage of communication channels caused by a traffic jam or for other reasons and a method for the same.

FIG. 1 is a view showing principles of a vehicle communication system according to the present invention. The vehicle communication system shown in FIG. 1 is a system in which communications for automated driving controls for vehicles is executed according to a zone system, and comprises a monitoring means 1, a detecting means 2, and a control means 3.

In the first principle of the present invention, the monitoring unit 1 is provided in one zone on a road, and monitors an information traffic volume in two or more areas each having a channel number of a time slot number allocated thereto. When an information traffic volume in one of the two or more areas above exceeds a prespecified rate, the control unit 3 provide controls for reallocating channels or time slots allocated to the other areas of the two or more areas to the one area.

In the communications based on a zone system on a road, the road is divided to several communication zones (radio zones) each having a specified range, and a required number of communication channels is allocated to each zone based on the time division system. Each zone is further divided to a plurality of areas according to, for instance, a boundary between lanes, and a specified number of channels or time slots available in each area is allocated thereto.

The monitoring unit 1 monitors, for instance, a number of channels or time slots being used in an area as an information traffic volume in the area, and reports the information traffic volume to the control means 3.

Then, the control means determines whether the information traffic volume reported from the monitoring unit 1 has exceeded a preset value or not. As this present value, for instance, an arbitrary value smaller than the number of allocated channels or time slots described above is used.

If an area where the information traffic volume may exceeds a preset value to cause overflow is detected, the control means 3 reallocates channels or time slots allocated to other areas in the same zone to the area to prevent occurrence of overflow. With this operation, shortage of communications associated with a traffic jam or the similar situation can be prevented.

In the second principle of the present invention, the monitoring means 1 is provided in a zone on a road, and monitors an information traffic volume in two or more areas each having a specified number of channels or time slots allocated thereto. When an information traffic volume in one of the two or more areas exceeds a prespecified value, the control means 3 provides controls for limiting a communication information volume for a vehicle in the area.

By limiting a communication information volume for one vehicle in an area where an information traffic volume may exceeds a preset value, for instance, a service requiring transmission of a large volume of information such as an image is temporally suspended. With this operation, by reallocated the saved time slots to other channels, shortage of communication channel can be prevented.

In the third principle of the present invention, the detecting means 2 is provided in one zone on a road, and detects a traffic jam in any one of two or more areas each having a specified number of communication channels or time slots allocated thereto. When a traffic jam occurs in one of the two or more areas, the control means 3 provides controls for limiting a communication information volume for a vehicle in the zone.

The detecting means 2 determines whether a traffic jam has been generated or not by checking a number of vehicles, a running speed of the vehicles, and distances between the vehicles in each area. When generation of a traffic jam has been detected in an area, the control means 3 limits a communication information volume for one vehicle in a zone including the area. By reallocating the saved time slots to other channels, shortage of communication channels can be prevented.

For instance, the monitoring means 1, detecting means 2, and control means 3 correspond to components of an information processing apparatus provided in a central station 11 shown in FIG. 2 described later.

DETAILED DESCRIPTION OF THE PREFERRED EMBODIMENTS

Detailed description is made hereinafter for embodiments of the present invention with reference to the attached drawings.

In the system according to the present invention, a unit zone of the vehicle communication system is divided to two or more areas by making use of form of a road such as a boundary between lanes or a branch, and a number of vehicles in each area is compared to a preset communication information volume for the area. By dynamically adjusting channel allocation and an information rate in each area according to demands from time to time, time slots are efficiently used in every channel. At first description is made for outline of the AHS.

In actual administration of the AHS, it is necessary to continuously transact, between a control system and a vehicle having started receiving the control service, control information and traffic information concerning without a break until the vehicle reaches the service-out point or until a request for service-out is sent from the user, and otherwise the vehicle could not be controlled accurately.

However, frequencies are important resources, so that it is desired to efficiently use the frequencies in the mobile communications. To satisfy the requirement, a road is divided to several zones each having a certain range, and the same frequency is repeatedly used in a plurality of zones fully distant from each other. Further, a specified number of time slots are allocated by means of time division to each channel in one zone.

Figure 2:
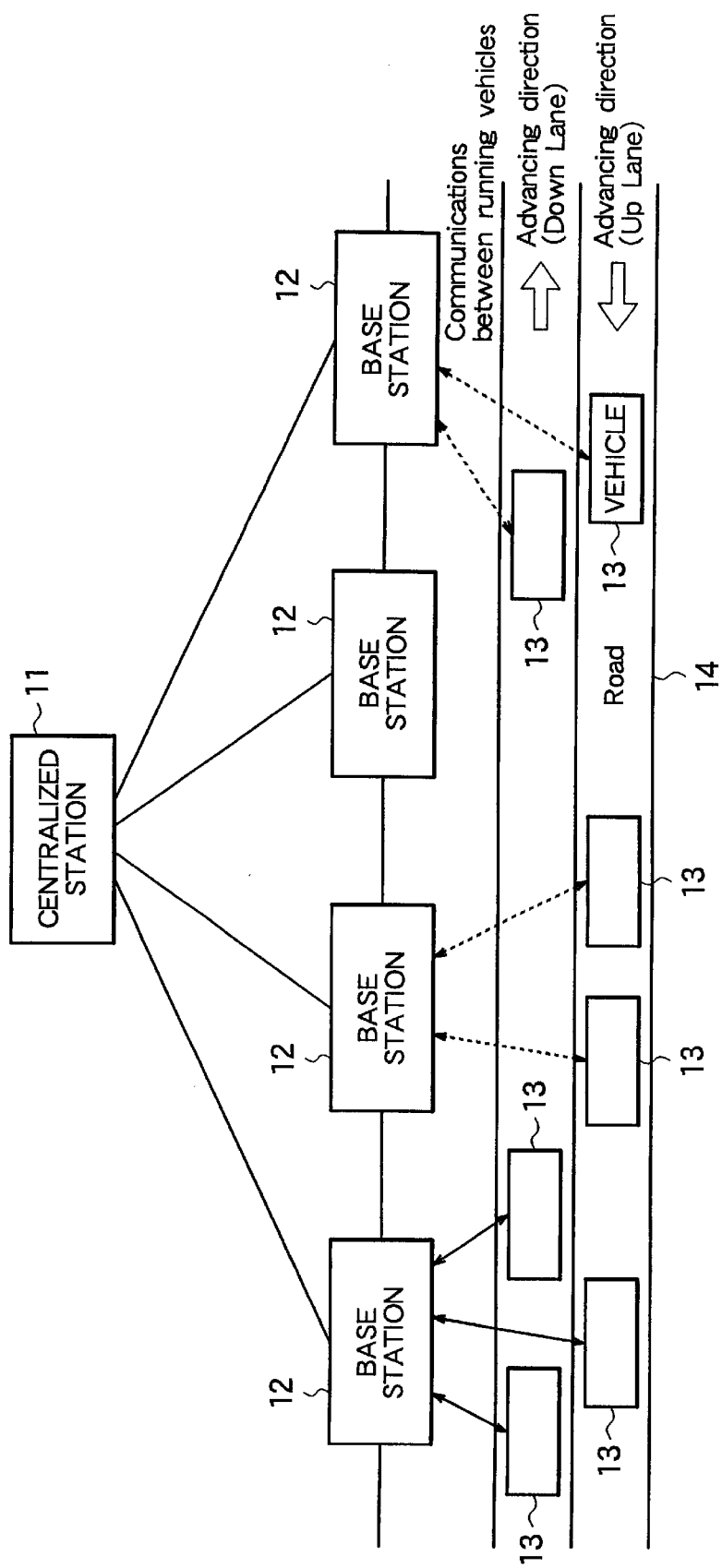
FIG. 2 is a block diagram showing an AHS.

FIG. 2 is a block diagram showing the AHS having the configuration as described above. In FIG. 2, a control system in the road side includes a centralized station 11 and a plurality of base stations 12 each having an information processing apparatus, and controls operations of a vehicle 13 running on a road 14. The base station 12 is provided in each zone, and is connected to the centralized station 11 through a line. The centralized station 11 is positioned in a upper layer of the control system in the road side issuing instructions to each base station 12.

As communications is performed between the base station 12 and the vehicle 13, for instance, a leaky coaxial cable (LCX) (not shown) or a communication antenna (not shown) is provided along the road, and the vehicle 13 communicates with the LCX or communication antenna. The following description assumes use of the LCX. Further, various types of sensor, a CCD (Charge Coupled Device), or the like for catching information concerning a situation on the road are provided according to the necessity.

The vehicle 13 has an antenna for communications, an information processing apparatus, various types of sensor, a CCD camera or the like loaded thereon, and further incorporates various types of actuator each for controlling the vehicle according to signals received from the road 14.

In the AHS shown in FIG. 2, for instance, a speed of the vehicle 13 is controlled as described below. At first, the vehicle 13 running ahead provides controls over a speed including starting or stopping according to an instruction for a speed from the LCX. The vehicle 13 running in the rear increases or reduces a speed to insure a certain distance from the vehicle 13 running ahead according to an instruction concerning a speed from the LCX as well as to information concerning the inter-vehicle distance from the vehicle 13 running ahead.

In this AHS, for instance, the following types of on-road sensor facilities are provided on the road 14:

a meteorological sensor for detecting meteorological conditions or the like;

a road surface sensor for detecting conditions of a road surface including a road surface $\mu$ indicating a friction coefficient between a road surface and a tire;

a running speed sensor for detecting an average speed of the vehicle 13 passing through the zone;

a position detecting sensor for detecting a position of the vehicle 13; and an on-road camera for catching images on a road.

Further, the following types of data generated in a vehicle are transmitted from a mobile station (vehicle 13) to the LCX:

ID data (ID number) for the vehicle 13;

information concerning the vehicle 13 running ahead;

information concerning a speed of the vehicle 13;

destination conditions of the vehicle 13

The base station 12 receiving the information as described above has the following functions:

collection and arrangement of data for arranging information transmitted from on-road sensors and information from the vehicles into a transmittable state and transmitting the data to the centralized station 11;

relay of information transmission from the centralized station 11 to the vehicle 13; When the vehicle 13 is running at the normal speed, the centralized station 11 controls a mobile station, and the base station 12 has only a function as a relay station; and communication with the adjacent base station 12 for transmitting information concerning passing vehicles and time of passage of each vehicle to the next base station 12 existing in a direction in which the vehicle 13 proceeds.

The centralized station 11 has the following functions.

extraction of data for each base station 12 (information from on-road sensors, data generated in vehicles)

analysis of data for each base station 12, and instructions to the base stations 12 and vehicles 13

By the way, the road 14 is usually separated to an up lane and a down lane, and advancing directions of two vehicles 13 on the two lanes are contrary to each other even in the same zone. Because of this feature, it is rare that traffic jams occur on the two lanes, and even if a traffic jam occurs on one of the lanes, generally vehicles run smoothly on the other lane. In other words, it may be said that there are always two different groups of mobile stations in a unit zone.

Accordingly, putting attention to the feature specified to each zone in the AHS, there are provided two or more areas which can be compared to each other on the road 14, and a number of channels and time slots allocated to each area are previously specified. And, by monitoring changes in traffic or a volume of transferred information in each area, a number of channels allocated to each area is changed or a number of time slots allocated to each channel is changed according to the necessity. With this operation, allocation of frequencies can dynamically be changed, and shortage of communications can be prevented.

Figure 3:
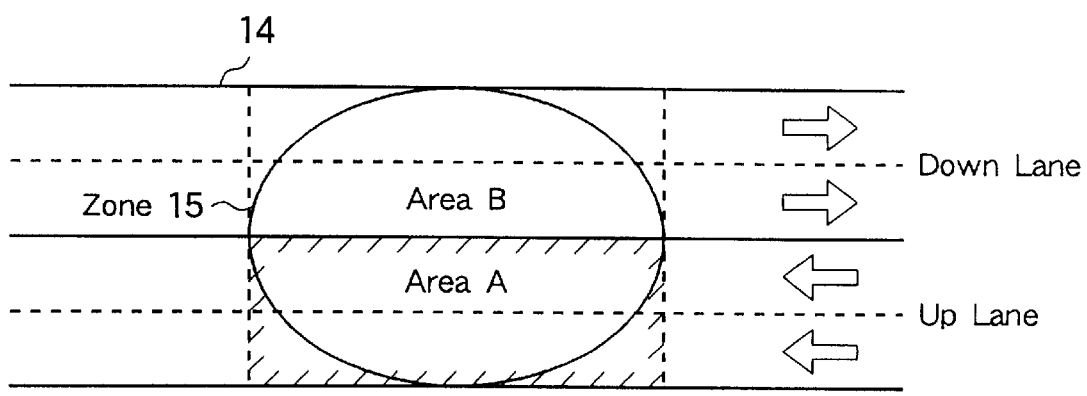
FIG. 3 is a view showing arrangement of a first area in a unit zone.
Figure 4:
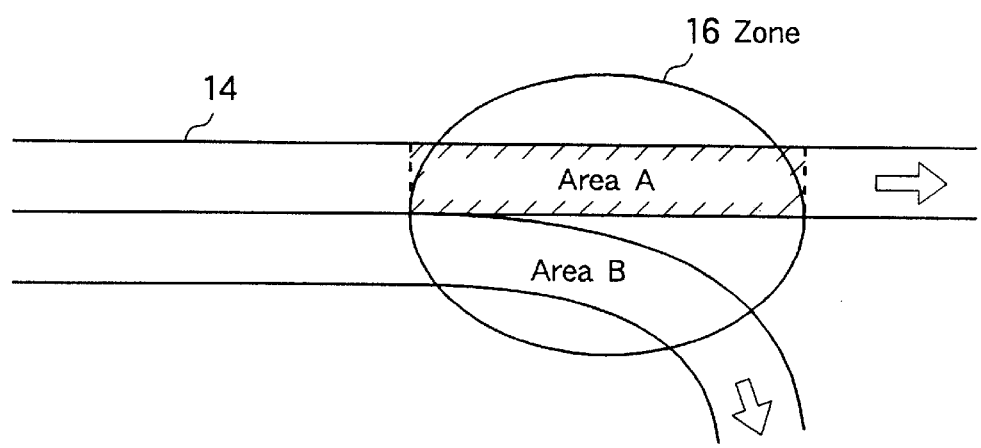
FIG. 4 is a view showing arrangement of a second area in the unit zone.
Figure 5:
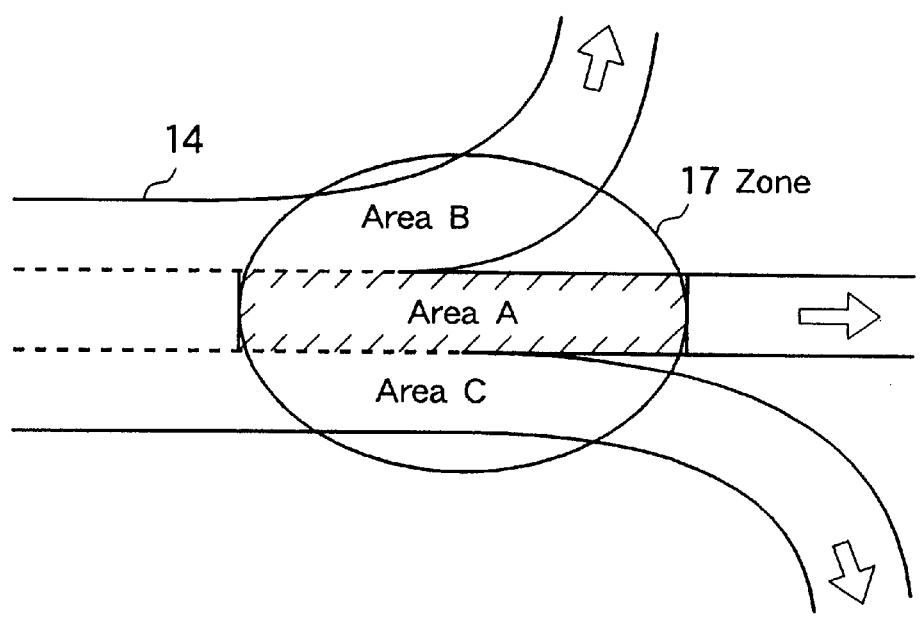
FIG. 5 is a view showing arrangement of a third area in the unit zone.

FIGS. 3, 4, and 5 each show an example of areas provided by dividing a region on the road 14 corresponding to a unit zone to lanes. A unit zone 15 shown in FIG. 3 is divided to an up lane area A and a down lane area B. A zone 16 shown in FIG. 4 corresponds to a place where the road 14 branches to two ways, and the unit zone 14 is divided to two areas of a branched lane area A and a branched lane area B. Further, a unit zone 17 shown in FIG. 5 corresponds to a place where the road 14 branches to two ways, and is divided to three areas of area A, area B, and area C.

As described above, two or more areas are provided in a unit zone according to forms of a road such as up and down lanes, branched lanes, an interchange, an entrance/exit of a service area or a parking area of a highway, or a junction.

Figure 6:
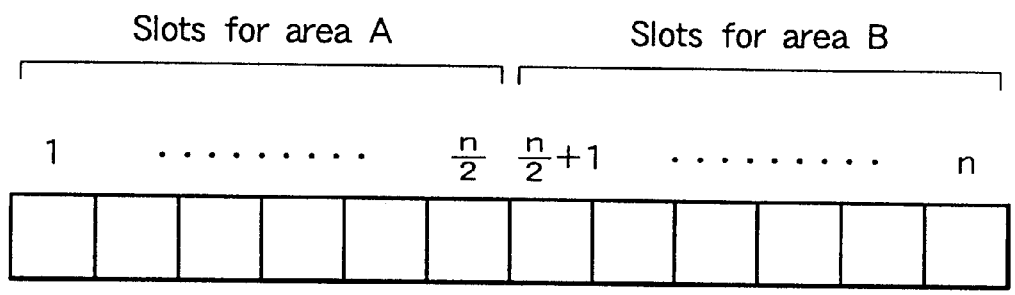
FIG. 6 is a view showing slots divided to two groups.

Assuming that a number of time slots available in a unit zone is n, when area arrangement is as shown in FIG. 3 and FIG. 4, n pieces of time slot are divided to two groups as shown, for instance, in FIG. 6. In FIG. 6, slots 1 to (n/2) are allocated to vehicles 13 in area A, while slots (n/2+1) to n are allocated to vehicles 13 in area B.

Figure 7:
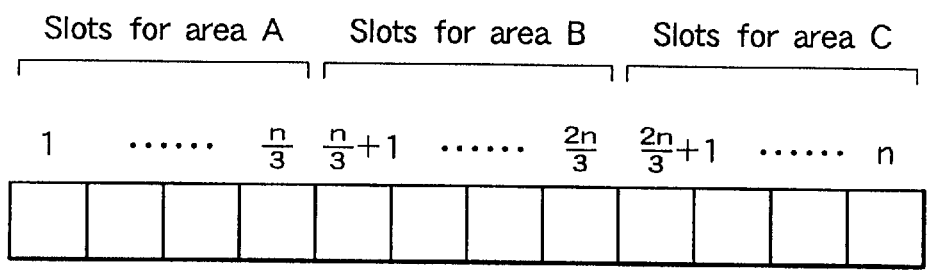
FIG. 7 is a view showing slots divided to three groups.

When area arrangement is as shown in FIG. 5, the time slots are divided to three groups as shown, for instance, in FIG. 7. In FIG. 7, slots 1 to n/3 are allocated to the vehicles 13 in area A, while slots (n/3+1) to (2n/3) are allocated to vehicles 13 in area B, and further slots (2n/3+1) to n are allocated to vehicles 13 in area C.

Also in a case where a plurality of roads joins into one road, areas are set like in a case of branching, and a number of channels and a number of time slots are allocated to each area.

The centralized station 11 executes processing for averaging vehicle communication services when a communication information volume in a zone acutely increases. In this processing, whether an information rate in each area in the zone has exceeded a specified value or not, and in an area where a specified value has been exceeded, a required number of channels are acquired by using empty slots in other areas. Or, a number of slots used by one vehicle is checked, and the number is adjusted.

Further, the centralized station 11 analyzes values provided from the on-road sensors described above and data generated in each vehicle to determine whether a traffic jam has been generated or not, and if it is determined that a traffic jam has been generated, reduces a number of times for transmission of control signals. Further, when a traffic jam occurs, the centralized unit 11 issues a compulsive instruction for asking running in a platoon to vehicles, which will pass the zone (vehicles in zones behind the current zone), at a point of time when the traffic jam occurs. With this operation, a plurality of vehicles 13 start running in a platoon as shown in FIG. 8.

Figure 8:
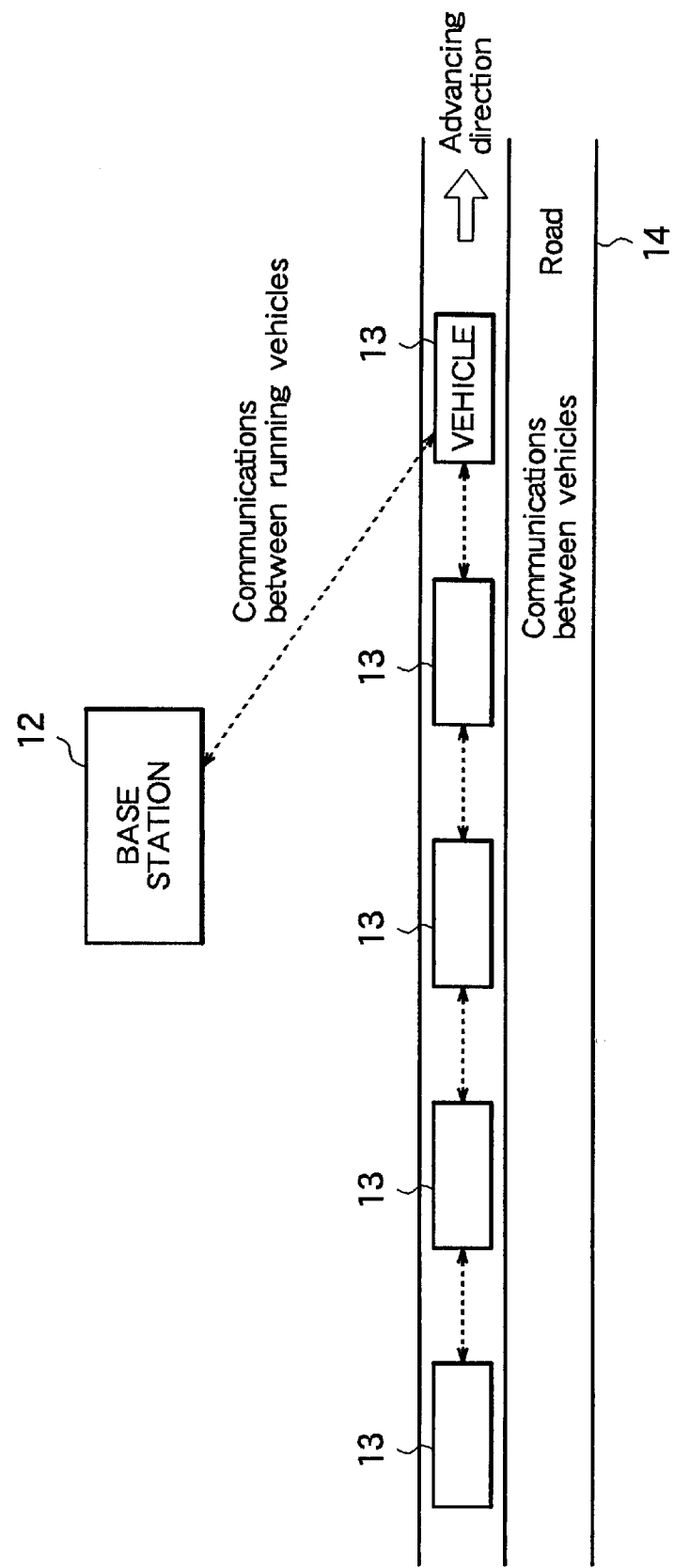
FIG. 8 is a view showing a row of running vehicles.
Figure 9:
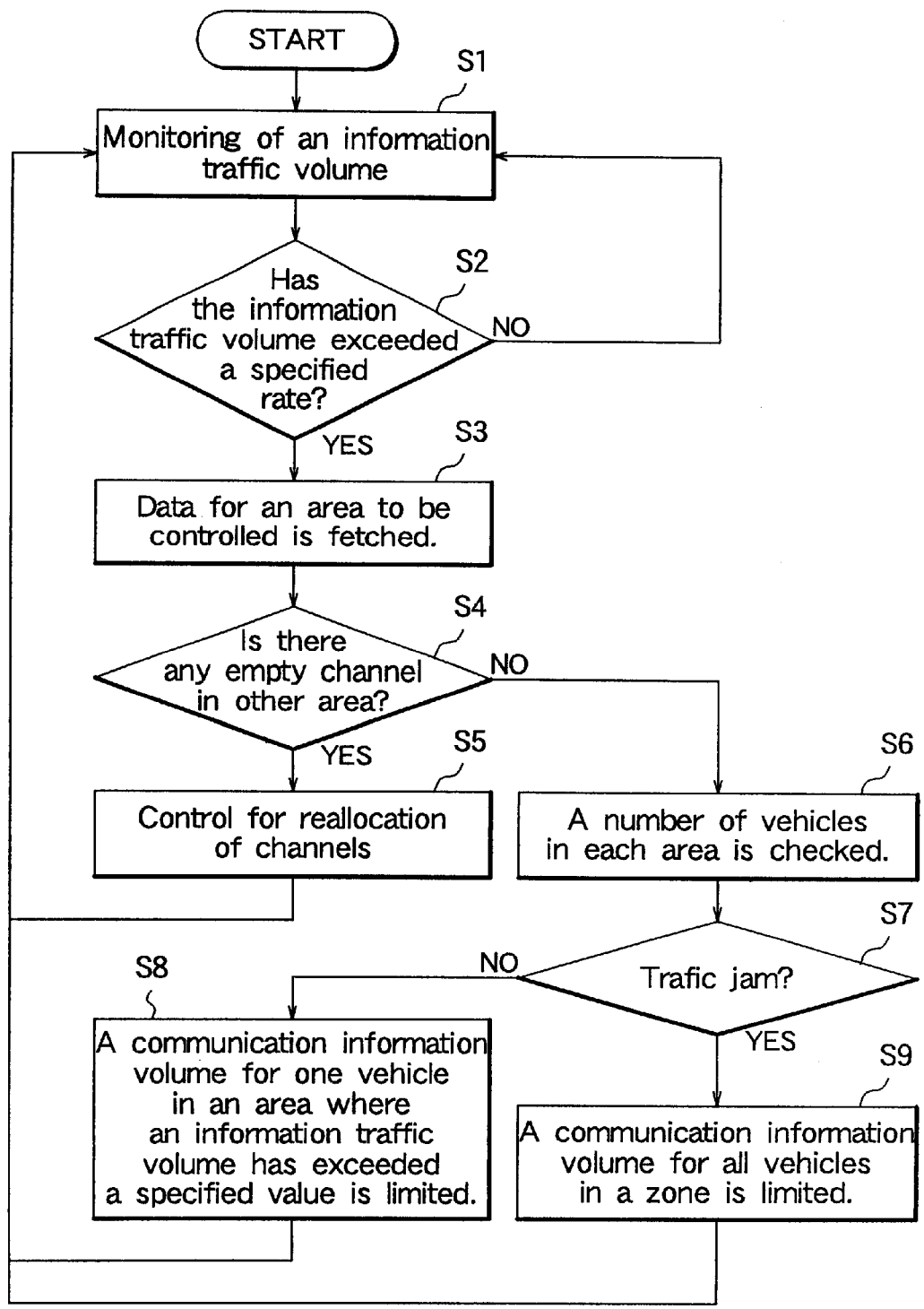
FIG. 9 is a flow chart showing processing for averaging.

In FIG. 8, of the five vehicles 13 running in a platoon, only the vehicle 13 running at a top of the platoon executes road-to-vehicle communications, and receives controls from the centralized station 11 via the base station 12. On the other hand, other vehicles 13 execute inter-vehicle communications and follows the vehicles running ahead keeping a constant inter-vehicle distance.

When the base station 12 receives an instruction for starting running in a platoon from the centralized station 11, the base station 12 transfers control information from the centralized station 11 only to the vehicle 13 running at a top of the platoon. The information is then successively transferred to vehicles 13 running in the rear.

As described above, by switching the road-to-vehicle communications with the vehicles 13 running in a platoon to inter-vehicle communications, a number of channels required for control can substantially be reduced. Accordingly, the channels are set in the slot-released state, and controls over all vehicles are provided efficiently. Vehicles 13 to be included in a platoon are decided by the centralized station 11. Controls for vehicles, which can not join the platoon, are controlled by the centralized station 11, and the base station 12 plays a role as a relay station.

Further the base station 12 periodically reports situations on the road to the centralized station 11, and the centralized station 11 determines whether the traffic jam has dissolved or not. When it is determined that the traffic jam has dissolved, the centralized station 11 sends an instruction allowing dissolving of running in a platoon to the base station 12. When the base station 12 receives the instruction, the base station 12 sends a request for acquiring channels for vehicles running in the rear, and receives information for the channels. Then, the base station 12 sends a signal allowing dissolving of running in a platoon to the vehicles 13, and the vehicles 13 dissolve the platoon. As described above, communications during a traffic jam are dynamically controlled.

Running in a platoon is a system originally contrived for controlling trucks running for the same destination, and on a highway, it can temporally be recognized that vehicles running in a direction on the same lane are running for the same destination. Therefore, it can be considered that the controls for running in a platoon can fully be realized and are effective for preventing shortage of required channels.

In the processing for averaging services, the centralized station 11 selects one of a plurality of prespecified control ranks for each vehicle, and applies the control rank to the vehicle. The following control ranks are conceivable.

Ordinary control rank: A state in which all of services desired by a user are available. For instance, a user can receive a multi-media service including image information or games.

Information limit control rank: A state in which a portion of information services desired by a user can not be received. For instance, a band width of a channel becomes narrower with multimedia services disconnected, and only information required for running under full control by the system is transacted.

Traffic jam control rank: A state in which a number of vehicles running in an area explosively increases and also a number of required channels acutely increases. A band width for a channel becomes further narrower with multimedia services cut off, and a volume of transacted information is limited to the minimum level. Generally it can be considered that a volume of information required for running at a low speed is substantially smaller than that required for running at a high speed.

Entry limiting service: A state in which the information that limited services are provided is announced at a time point of service-in. In this case, a user understands that services usually available may be stopped on the way.

Figure 1:
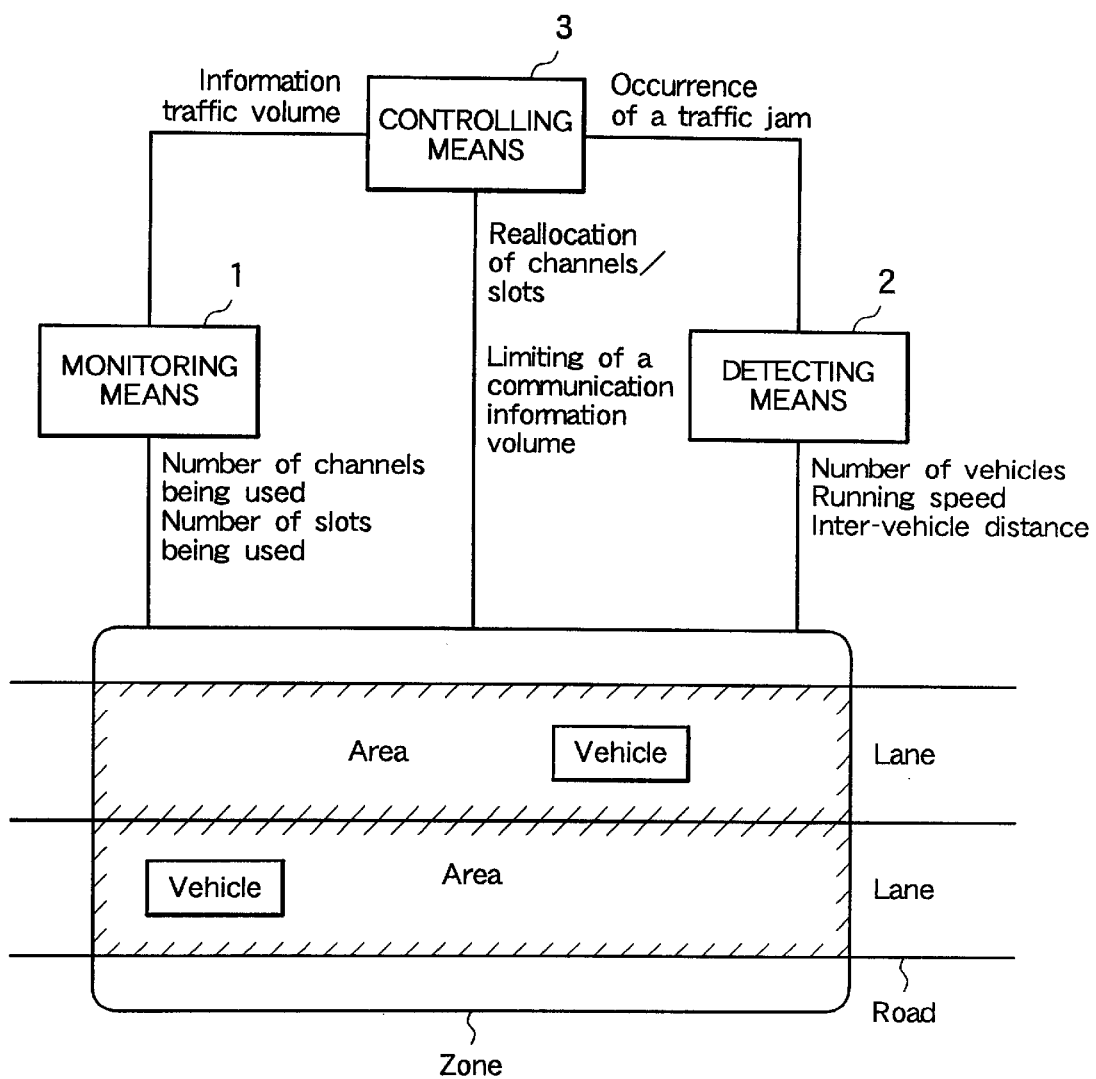
FIG. 1 is a view showing principles of the vehicle communication system according to the present invention.

Description is made hereinafter for the averaging processing by the centralized station 11 with reference to the flow chart shown in FIG. 1. Herein, it is assumed that one channel is allocated to each vehicle, and a number of slots allocated to each channel can be changed.

When the processing is started, the centralized station 11 monitors an information traffic volume in each zone under control by the centralized station 11 according to data send from each base station 12, and determines whether the information traffic volume has exceeded a specified value or not (step S2).

The information traffic volume indicates a number of used channels or a number of used time slots in each of areas in a zone. As the specified value, an arbitrary value smaller than a number of channels and a number of slots each previously allocated to each area is used. For instance, a value, which is around 80% of a numerical value allocated to each area, may be used as a specified value.

When an information traffic volume in any area does not exceeds a specified value, the monitoring operation in step S1 is continued. When an information traffic volume in one area exceeds a specified value, then data for other areas each as an object for comparison in the same zone is fetched (step S3), and whether there is any empty channel in the area or not is checked (step S4).

When it is determined that there is any empty channel, control is provided for reallocating channels in the zone is executed by making use of the empty slots (step S5), and the monitoring operation in step S1 is continued.

For instance, in a case where most slots for area A in FIG. 8 are being used and an information traffic volume in the area A has exceeded a specified rate, empty slots for area B are reallocated to area A, and a number of channels or a number of time slots allocated to the area A temporally increases. With this operation, shortage of channels in the area A can be prevented.

If there is no empty area in other areas, then a number of vehicles running in each area is checked (step S6), and determination is made as to whether a traffic jam has been generated or not (step S7). Although it is considered that a number of vehicles 13 running in an area is coincident to a number of channels being used in the area, the number may be computed from other various types of data sent from the base station 12. In step S7, it is determined, when a number of vehicles 13 has exceeded a specified value, that a traffic jam has been generated.

Alternatively, in place of checking a number of vehicles running in each area, whether a traffic jam has occurred or not can be determined by checking an average running speed of vehicles running or an average inter-vehicle distance within the area.

When it is not determined that a traffic jam has occurred, in an area where an information traffic volume has exceeded a specified value, a communication information volume for one vehicle is limited (step S8), and the monitoring operation in step S1 is continued. In step S8, for instance, all of channels in the area are set to the information limiting control rank, and a number of slots allocated to one channel is reduced. As a result, a portion of services to a user occupying a large frequency band is stopped.

When it is determined that a traffic jam has occurred, a communication information volume for all vehicles 13 running in the zone including the area is limited (step S9), and the monitoring operation in step S1 is continued.

In step S9, for instance, all of the channels in the zone are set to the jam control rank, and a number of time slots for one channel is reduced. Also the need for running in a platoon is instructed to all vehicles running toward the zone, and a channel of the vehicle 13 entering the highway and running toward the zone after this point of time is set to the entry limiting rank.

When the traffic jam is over, the instruction for running in a platoon is canceled, and the channels having been set to the jam control rank and entry limiting rank are again set to the information limit control rank. When the information traffic volume becomes lower than a specified value, the channels having been set to the information limit control rank is restored. to the ordinary control rank.

As described above, a communication rate in each area in a zone is put under centralized control, and by giving channels (or slots) for other areas to an area where traffic overflow may temporally occur, it becomes possible to provide more flexible communication controls. With this feature, shortage of communication channels associated with a traffic jam or others can be prevented.

In the embodiment described above, channel control is provided by executing the averaging processing with the centralized station 11, but the configuration is allowable in which the base station 12 controls channels in the corresponding zone.

In FIG. 2, the control system for the AHS comprises two layers of the centralized station 11 and base station 12, but a control center giving instructions to a plurality of centralized stations 11 may be provided in a layer above the centralized station 11 to form a layered structure consisting of three or more layers. In that case, the control center executes the averaging processing in place of the centralized station 11.

When vehicles 13 are running in a platoon, it is not always required for the vehicle 13 running at a top of the platoon to communicate with the base station 12, and any vehicle belonging to the platoon may communicate with the base station 12 so that other vehicles 13 are controlled by means of inter-vehicle communications.

With the present invention, adjustment for channel allocation and a communication information volume is executed for each of areas arranged according to forms of a road, so that flexible communication control well suited to the AHS is realized. With this feature, shortage of channels associated with a traffic jam can be prevented, and even if a traffic jam occurs, controls for driving under automated controls can be provided smoothly.

What is claimed is:

1. A vehicle communication system in which communications for automated driving control for vehicles is executed according to a zone system; said vehicle communication system comprising:

a monitoring means for monitoring an information traffic volume in two or more areas provided in a zone on a road and each having a specified number of channels or a specified number of time slots allocated thereto; and a controlling means for controlling reallocating, when an information traffic volume in one area of the two or more areas has exceeded a specified value, channels or time slots allocated to other areas of the two or more areas to said one area.

2. A vehicle communication system according to claim 1; wherein the two or more area are previously arranged, according to forms of a road, on the road.

3. A vehicle communication system according to claim 2; wherein the two or more areas correspond to different lanes on the road respectively.

4. A vehicle communication system according to claim 1; wherein the monitoring system monitors a number of channels being used in each of the two or more areas respectively as the information traffic volume, and the controlling means reallocates, when a number of channels used in one of the two or more areas exceeds a specified value, channels allocated to other areas of the two or more areas to said one area.

5. A vehicle communication system according to claim 1; wherein the monitoring means monitors a number of time slots used in each of the two or more areas as the information traffic volume respectively, and reallocates, when a number of time slots being used in one area exceeds the specified value, time slots allocated to the other areas to said one area.

6. A vehicle communication system in which automated driving control for vehicles is executed according to a zone system, said vehicle communication system comprising:
a monitoring means for monitoring an information traffic volume in each of two or more areas each having a specified number of channels or a specific number of time slots allocated thereto provided in a zone on a road; and
a controlling means for limiting, when an information traffic volume in one area of the two or more areas exceeds a specified value, a communication information volume for one vehicle running in said one area.

7. A vehicle communication system in which communication for automated driving control for vehicles is executed according to a zone system, said vehicle communication system comprising:
a detecting means for detecting a traffic jam in any of two or more areas each having a specific number of channels or a specified number of time slots allocated thereto provide in a zone on a road; and
a controlling means for limiting, when a traffic jam occurs in one of the two or more areas, a communication information volume for one vehicle running in the zone.

8. A vehicle communication system according to claim 7; wherein the detecting unit detects a traffic jam according to information concerning at least one of a number of vehicles, a running speed of each vehicle, and an inter-vehicle distance in each of the two or more areas.

9. A vehicle communication system according to claim 7; wherein the controlling means provides controls, when a traffic jam occurs in said one area, for making a plurality of vehicles, which will pass through the zone, in a platoon.

10. A vehicle communication system in which communications for automated driving controls for vehicles is executed according to a zone system, said vehicle communication system comprising:
a monitoring system for monitoring an information traffic volume in two or more areas each having a specific number of channels or a specific number of time slots allocated thereto provided in one zone on a road;
a detecting means for detecting a traffic jam in any of the two or more areas; and
a controlling means for providing communication controls by checking whether an information traffic volume in one of the two or more areas has exceeded a specified value or not, and whether a traffic jam has occurred in one of the two or more areas.

11. A vehicle put under automated driving control by means of communications based on a zone system comprising:
a means for executing communications using channels allocated to an area, to which the vehicle belongs, of two or more areas each having a specific number of channels or a specified number of time slots allocated thereto provided in one zone on a road; and
a means put under controls for reallocating, when an information traffic volume in the area, to which the vehicle belongs, exceeds a specified value, channels or time slots allocated to other areas of the two or more areas.

12. A vehicle put under automated driving controls by means of communications based on a zone system comprising:
a means for executing communications using channels allocated to an area, to which the vehicle belongs, of two or more areas each having a specific number of channels or a specified number of time slots allocated thereto provided in one zone on a road; and
a means put under controls for limiting an information communication volume for the vehicle when an information traffic volume in an area, to which the vehicle belongs, exceeds a specified value.

13. A vehicle put under controls for automated driving controls based on a zone system comprising:
a means for executing communications using channels allocated to an area, to which the vehicle belongs, of two or more areas each having a specific number of channels or a specific number of time slots allocated thereto provided in a zone on a road; and
a means put under controls for limiting a communication information volume for the vehicle when a traffic jam has occurred in any of the two or more areas.

14. A vehicle communication method comprising the steps of:
providing a plurality of communication zones on a road;
providing two or more areas each having a specified number of channels or a specific number of time slots allocated thereto in one of the plurality of communication zones;
automatically controlling running of vehicles by executing communications for each zone;
monitoring an information traffic volume in each of the two or more areas; and
reallocating, when an information traffic volume in one of the two or more areas exceeds a specific value, channels or time slots allocated to the other areas of the two or more areas.

15. A vehicle communication method comprising the steps of:
providing a plurality of communication zones on a road;
providing two or more areas each having a specific number of channels or a specific number of time slots allocated thereto in one zone of the plurality of communication zones;
automatically controlling driving of vehicles by executing communications for each zone;
monitoring an information traffic volume in each of the two or more areas; and limiting, when an information traffic volume in one area of the two or more areas exceeds a specified value, a communication information volume for one vehicle in said one area.

16. A vehicle communication system comprising the steps of:

providing a plurality of communication zones on a road;

providing two or more areas each having a specific number of channels or a specific number of time slots allocated thereto in one zone of the plurality of communication zones;

automatically controlling running of vehicles by executing communications for each zone; and limiting, when a traffic jam occurs in any of the two or more areas, a communication information volume for one vehicle in the zone.

* * * * *